(12) United States Patent
Volby

(10) Patent No.: US 8,475,227 B2
(45) Date of Patent: Jul. 2, 2013

(54) BEE FEEDER ASSEMBLY; COMPONENTS; AND, METHODS

(75) Inventor: Stuart Allen Volby, Hackensack, MN (US)

(73) Assignee: Mann Lake, Ltd., Hackensack, MN (US)

( * ) Notice: Subject to any disclaimer, the term of this patent is extended or adjusted under 35 U.S.C. 154(b) by 246 days.

(21) Appl. No.: 12/387,246

(22) Filed: Apr. 23, 2009

(65) Prior Publication Data

US 2009/0311942 A1    Dec. 17, 2009

Related U.S. Application Data

(60) Provisional application No. 61/126,798, filed on May 6, 2008.

(51) Int. Cl.
    *A01K 53/00*      (2006.01)

(52) U.S. Cl.
    USPC ............................................. 449/48; 449/10

(58) Field of Classification Search
    USPC ............................................. 449/2, 9, 10, 48
    IPC ....................................................... A01K 53/00
    See application file for complete search history.

(56) References Cited

U.S. PATENT DOCUMENTS

| | | | | |
|---|---|---|---|---|
| 204,767 A * | 6/1878 | Shuck | ............... | 449/10 |
| 784,072 A * | 3/1905 | Roberts | ............ | 449/11 |
| 3,526,913 A * | 9/1970 | Warner | ............ | 449/10 |
| 3,835,487 A * | 9/1974 | Grigg | ............... | 449/11 |
| 3,842,457 A * | 10/1974 | Johnson | ........... | 449/11 |
| 4,214,329 A * | 7/1980 | Kozlowicz | ........ | 449/9 |
| 5,069,651 A * | 12/1991 | Arndt | .................. | 449/2 |
| 5,348,511 A * | 9/1994 | Gross et al. | ........ | 449/2 |

FOREIGN PATENT DOCUMENTS

FR      2578389 A1 *   9/1986

OTHER PUBLICATIONS

Declaration of Inventor Stuart Volby.
Exhibit A, To Declaration of Inventor Stuart Volby.
Exhibit B, To Declaration of Inventor Stuart Volby.
Exhibit C, To Declaration of Inventor Stuart Volby.
Exhibit D, To Declaration of Inventor Stuart Volby.
Exhibit E, To Declaration of Inventor Stuart Volby.

* cited by examiner

*Primary Examiner* — Rob Swiatek
*Assistant Examiner* — Kathleen Iwasaki
(74) *Attorney, Agent, or Firm* — Merchant & Gould P.C.

(57) ABSTRACT

A bee feeder assembly is provided, including a receptacle, a cover member and a ladder arrangement. The ladder arrangement includes at least one ladder member comprising a porous member depending downwardly from the cover member. Methods of assembly and use are described.

14 Claims, 11 Drawing Sheets

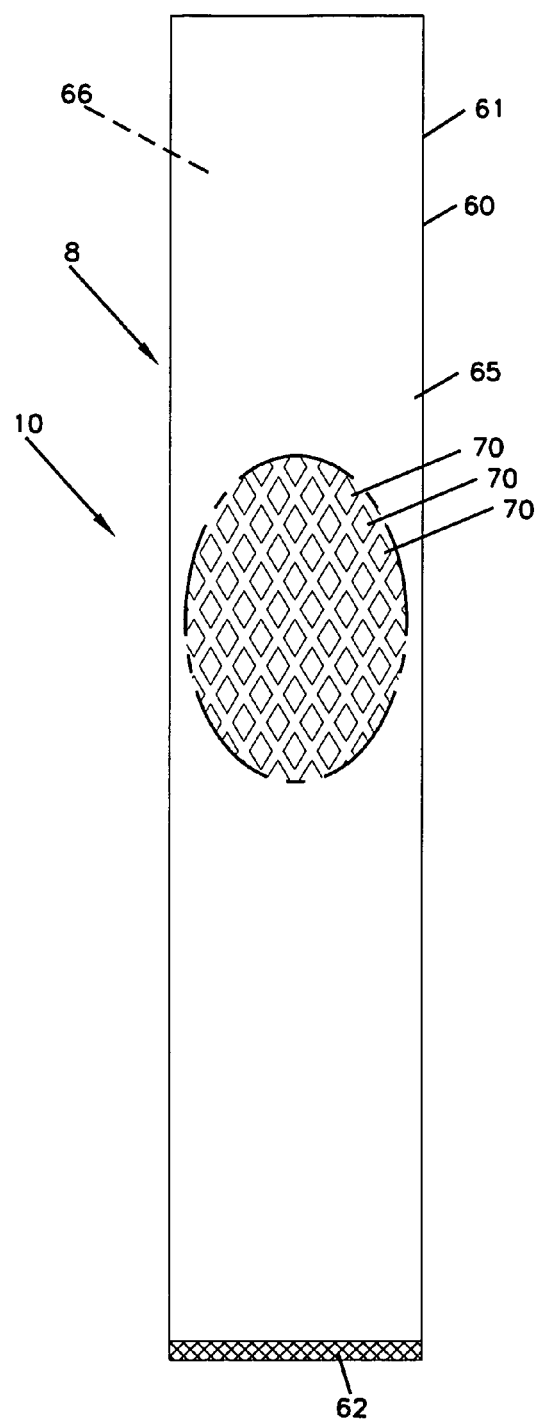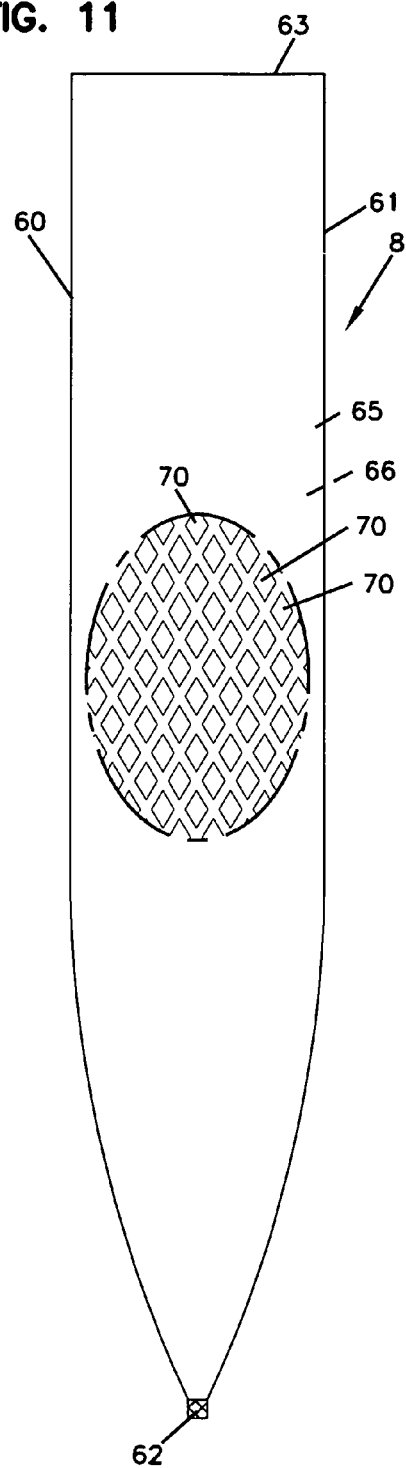

BEE FEEDER ASSEMBLY; COMPONENTS; AND, METHODS

CROSS-REFERENCE TO RELATED APPLICATION

The present application includes the disclosure of U.S. provisional application 61/126,798, filed May 6, 2008. A claim of priority is made to provisional U.S. Ser. No. 61/126, 798, to the extent appropriate. Provisional application 61/126,798 is incorporated herein by reference, in its entirety.

FILED OF THE DISCLOSURE

The present disclosure relates to feeder assemblies, for feeding bees. The assemblies are particularly useful in a commercial bee operation, in which the feeders are positioned within a hive box. Each of the feeders includes: a receptacle for retaining nutrient for bees; a convenient removable cover assembly for the receptacle; and, a ladder assembly configured for bees to enter the receptacle and climb back out, in a preferred manner.

BACKGROUND

In commercial bee operations, carbohydrate nutrient for the bees is generally provided by supplying the bees with a carbohydrate mixture, such as a high fructose corn syrup or sugar syrup mixture. The nutrient mixtures are placed in hives, in containers. A closed container with passageways therethrough, for bee entry, is typically provided.

Improvement is desired in bee feeder assemblies, for: convenience of assembly and installation; convenience of cleaning; and, convenient use by bees.

SUMMARY

According to the present disclosure, a bee feeder assembly is provided. In general, the bee feeder assembly includes a receptacle defining an interior and having an open top. A cover assembly, comprising a cover member, is positioned over the top to close the receptacle. The cover member includes at least one bee transport aperture therethrough. A typical cover member includes a plurality of bee transport apertures therethrough, and in an example depicted, two bee transport apertures are provided. The bee transport apertures are intended to be sufficiently large to accommodate passage of a bee population therethrough, to obtain nutrient from the interior of the receptacle.

The cover assembly further includes a bee ladder arrangement positioned within the receptacle interior depending downwardly from the cover member. Typically, the bee ladder arrangement comprises at least one inner bee ladder depending from each transport aperture on the cover member. Each inner bee ladder typically has a sidewall defining an open end, a closed end, and a hollow interior. Each bee ladder is positioned to depend downwardly from a bee transport aperture, oriented so that bees passing through the bee transport aperture enter the interior of the bee ladder, through the open end thereof.

The bee ladder is sufficiently porous for nutrient to flow into the interior of the bee ladder. However, the pores are typically chosen to be sufficiently small, to inhibit bees from passing therethrough, into the interior of the receptacle but exterior of the bee ladder.

In use, then, bees enter the bee feeder assembly through the bee transport aperture(s). Bees enter the interior of the ladder(s) and obtain access to the nutrient. The bees can then crawl upwardly along the ladder(s), back to the aperture, to exit the bee feeder. Since the bees are inhibited from passing through the pores in the bee ladder(s), the bees do not typically move about in the interior of the receptacle, exterior of the bee ladder. This prevents the bees from building hives or other obstructions within the bee feeder.

Methods of assembly and use are described.

There is no specific requirement that an assembly include all of the features characterized herein, to obtain some benefit according to the present disclosure.

BRIEF DESCRIPTION OF THE DRAWINGS

FIG. 10 is a side elevational view of an interior ladder component of a bee feeder assembly according to the present disclosure.

FIG. 11 is second side elevational view of the ladder component of FIG. 10, taken generally in the direction of arrow 11, FIG. 10.

DETAILED DESCRIPTION

I. General Features, FIGS. 1-12

Figure 1:
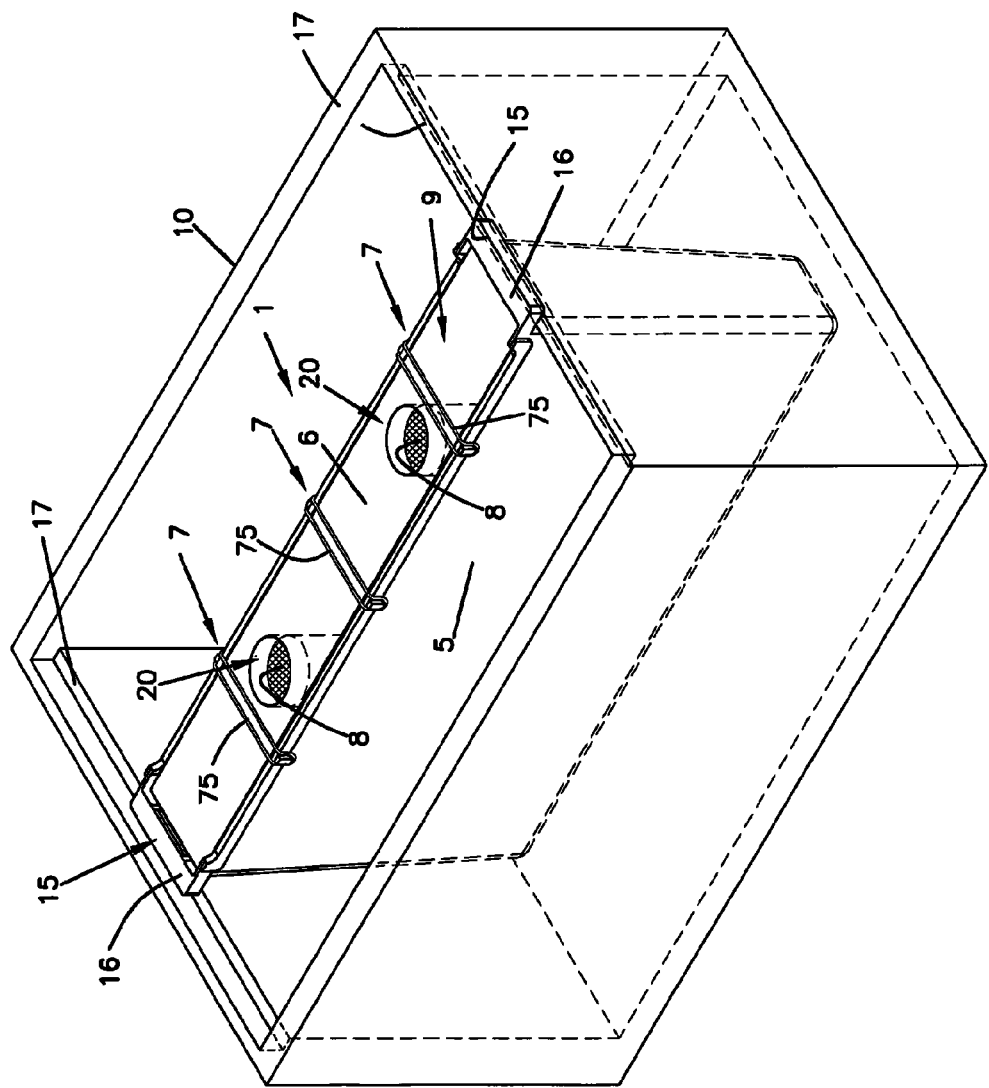
FIG. 1 is a schematic, top perspective view of a bee feeder assembly according to the present disclosure, positioned in a hive box.

Reference numeral 1, FIG. 1 generally indicates a bee feeder assembly according to the present disclosure. In general terms, the bee feeder assembly 1 includes a lower receptacle 5, a removable cover member 6, and a releasable securing arrangement 7 for securing the removable cover member 6 to the receptacle 5, until separation is desired; and, an interior ladder arrangement 8, by which bees can enter an interior of receptacle 5, for access to nutrient contained therein. Herein, the ladder arrangement 8 and cover member 6 will sometimes be collectively referred as a cover assembly 9.

Still referring to FIG. 1, bee feeder assembly 1 depicted is positioned in a hive box 10. In a typical hive box 10, there would also be positioned a frame or foundation for bees to build hive on, within the hive box. The frame or foundation structure can be conventional, and is not depicted in FIG. 1 for convenience of viewing of the feeder assembly 1.

Still referring to FIG. 1, for mounting within hive box 10, bee feeder assembly 1 includes support arrangement 15, in the example shown comprising opposite hanger projections 16, which can engage shelf arrangement 17 within hive box interior 10$i$, suspending bee feeder assembly 1 within interior 10$i$. It is noted that the hanger projections 16 also comprise a convenient handle arrangement, for carrying assembly 1.

In typical use, bee feeder assembly 1 is prepared for installation, by the following steps. The securing arrangement 7 (if engaged) is released, allowing the cover member 6 to be removed from receptacle 5. Within an interior of the receptacle 5, is positioned bee nutrient, typically carbohydrate containing liquid, usually an aqueous mixture. Typical commercial bee feeds can be used, such as high fructose syrup or sugar syrup solutions or blends. Such materials are available from Mann Lake, Ltd, of Hackensack, Minn., 56452, the assignee of the present invention. Carbohydrate nutrient can be purchased from suppliers such as Cargill, ADM, Staley's, and United Sugar.

The cover member 6 is then placed over receptacle 5, with interior ladder arrangement 8 projecting downwardly into the nutrient solution. The securing arrangement 7 is then positioned in place, to secure cover 6 in place. Bee feeder assembly 1 is then positioned in a hive box 10, as shown.

In time, bees will enter ladder arrangement 8 through bee transport aperture arrangement 20. The ladder arrangement 8 is adjacent the aperture arrangement 20 and allows the bees to crawl down to the nutrient solution, and then crawl back outwardly from an interior of receptacle 5. As will be understood from further description, ladder arrangement 8 is preferably configured so that the bees cannot pass outwardly therefrom, into an interior of the receptacle 5. However, the ladder arrangement 8 is configured with a sufficiently porous wall to allow nutrient flow therethrough, for access by the bees.

When the nutrient has been sufficiently depleted, the bee feeder assembly 1 can be removed from the hive box 10 and be: opened, cleaned, recharged with nutrient solution, reclosed and re-installed in box 10.

Figure 2:
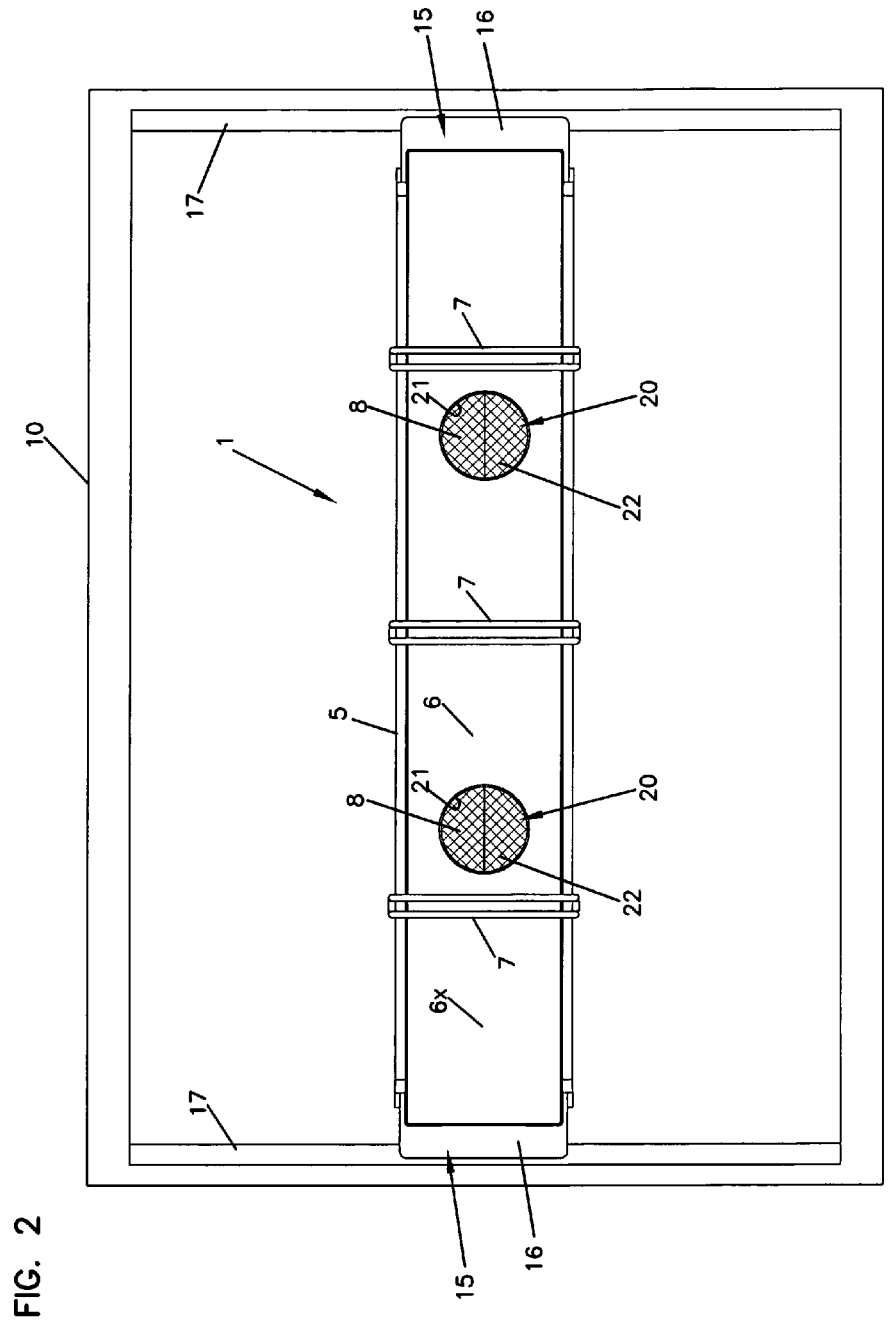
FIG. 2 is a schematic, top plan view of the bee feeder assembly/hive box combination of FIG. 1.

In FIG. 2, a top plan view of assembly 1 is provided. Bee transport aperture arrangement 20 is viewable, through cover member 6, for entry into ladder arrangement 8.

Referring to FIG. 2, for the particular assembly 1 depicted, the bee transport aperture arrangement 20 comprises a plurality of bee transport apertures 21, through upper member 6. The specific example assembly 1 depicted, includes two apertures 21 through cover member 6; and, the ladder arrangement 8 includes a ladder member 22 associated with each aperture 21. Thus, the example assembly 1 depicted, includes two ladders 22, although alternatives are possible.

Figure 3:
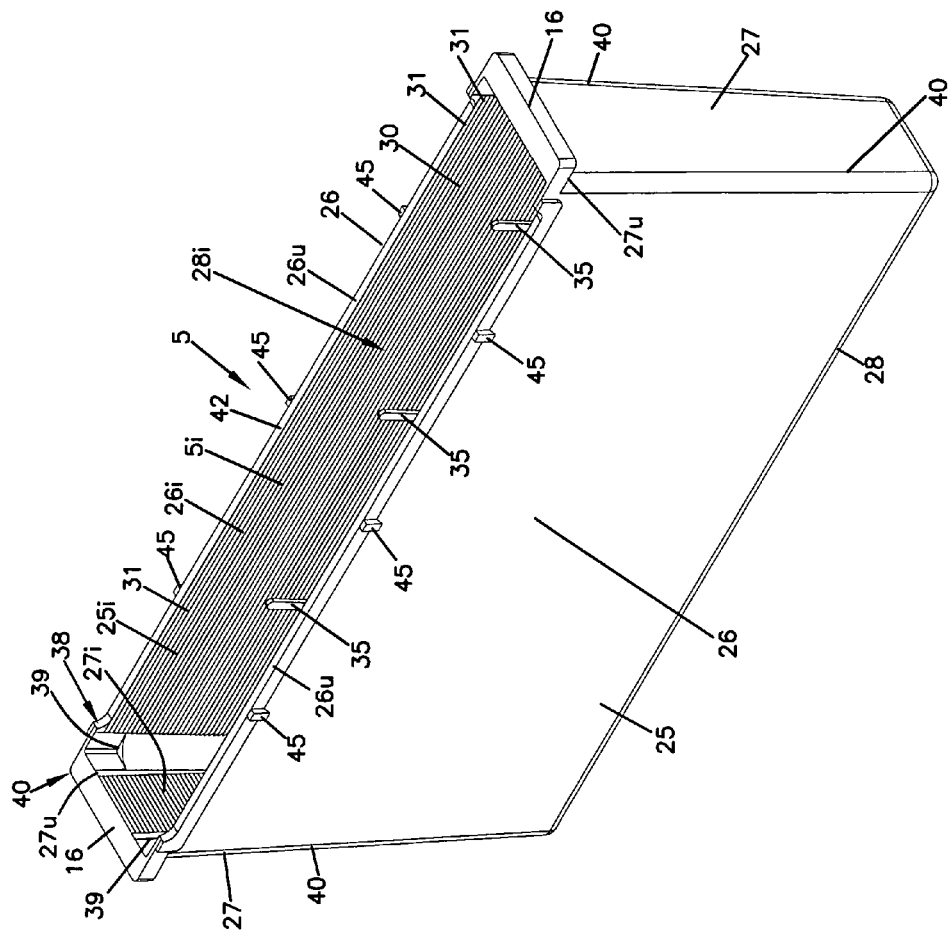
FIG. 3 is a schematic, top perspective view of a receptacle component of the bee feeder assembly of FIGS. 1 and 2.

Attention is now directed to FIG. 3. In FIG. 3, a top perspective view of receptacle 5 is viewable. Receptacle 5 includes a wall 25 defining: first and second, opposite, long sidewalls 26; first and second, opposite, short sidewalls, or end walls, 27 and, bottom 28. Receptacle 5 further includes, as previously characterized, opposite projections 16; in the example depicted, one each associated with an upper end 27$u$ of each end wall 27.

Receptacle 5 will typically be a molded plastic part, although alternatives are possible. A plastic such as polypropylene, polyethylene, PCV, ABS; or, HIPS can be used, although alternatives are possible. Typically, the plastic will comprise polypropylene.

Still referring to FIG. 3, receptacle 5, i.e. wall 25, defines an open interior 5$i$. Interior 5$i$, is defined by: interior surface 26$i$, of opposite walls 26; interior sides 27$i$, of opposite end walls 27; and, an interior surface 28$i$, not viewable in FIG. 3, of bottom 28.

The interior of 5$i$ includes a sidewall ladder arrangement 30. In general, the sidewall ladder arrangement 30 comprises a plurality of vertically spaced, horizontally extending ribs or shelves 31, sized and configured so that bees can crawl up the ribs or shelves if necessary. It is anticipated that typically bees will not be able to reach interior surfaces 25$i$, of wall 25, since they will be inhibited therefrom, in normal use, by the bee ladder arrangement 8, as described below. However, should the receptacle 5 either be used without the bee ladder arrangement 8 or should the bee ladder arrangement 8 fail or become dislodged, bees within interior 5 will be able to reach ladder arrangement 30 and climb up interior surface 25$i$.

Still referring to FIG. 3, it is further noted that opposite walls 26 include, on interior surfaces 26$i$ thereof, spaced vertical ribs 35 which provide a strengthening to walls 26.

In FIG. 3, a corner support arrangement 38, comprising a shelf member 39 in each of the four corners 40 of sidewall 25, is depicted. The example shelf arrangement 39 is recessed from an upper most end 42 of sidewall 25. The shelf arrangement 39 is positioned to support cover member 6, FIG. 1, at a desired location during assembly.

Still referring to FIG. 3, it is noted that upper ends 26$u$ of sidewalls 26 are recessed slightly, downwardly, from projections 16. In general, cover member 6 is typically nested recessed from an uppermost portion of projections 16, resting on support arrangement 38, with an upper surface 6$x$, FIG. 2, flush, or nearly flush, with surfaces 26$u$.

Referring to FIG. 3, adjacent upper edge 26$u$, each of sidewalls 26 includes spaced projections 45 thereon. The projections 45 operate as retaining hooks or projections, for securing assembly 7, FIG. 1. This will be discussed further below.

Figure 4:
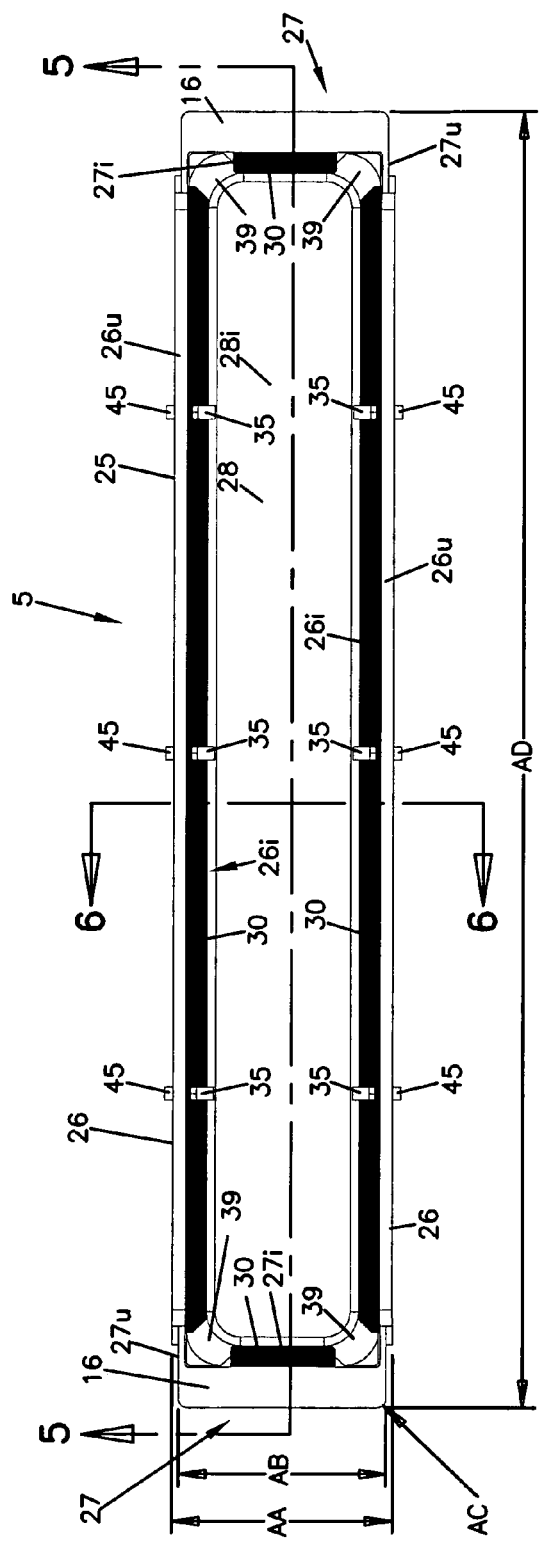
FIG. 4 is a schematic, top plan view of the receptacle of FIG. 3.

Attention is now directed to FIG. 4, a top plan view of receptacle 5. Interior bottom 28$i$ is viewable, and is closed. Ladder arrangement 30, on interior surfaces 26$i$, 27$i$ is depicted as dark patches, since the individual ribs 31 thereon, FIG. 3, are not individually distinguishable in the view of FIG. 4. It is noted that each of the surfaces 26$i$, 27$i$ slants somewhat inwardly, as it extends downwardly, from upper edges 26$u$, 27$u$ toward bottom 28$i$.

Figure 5:
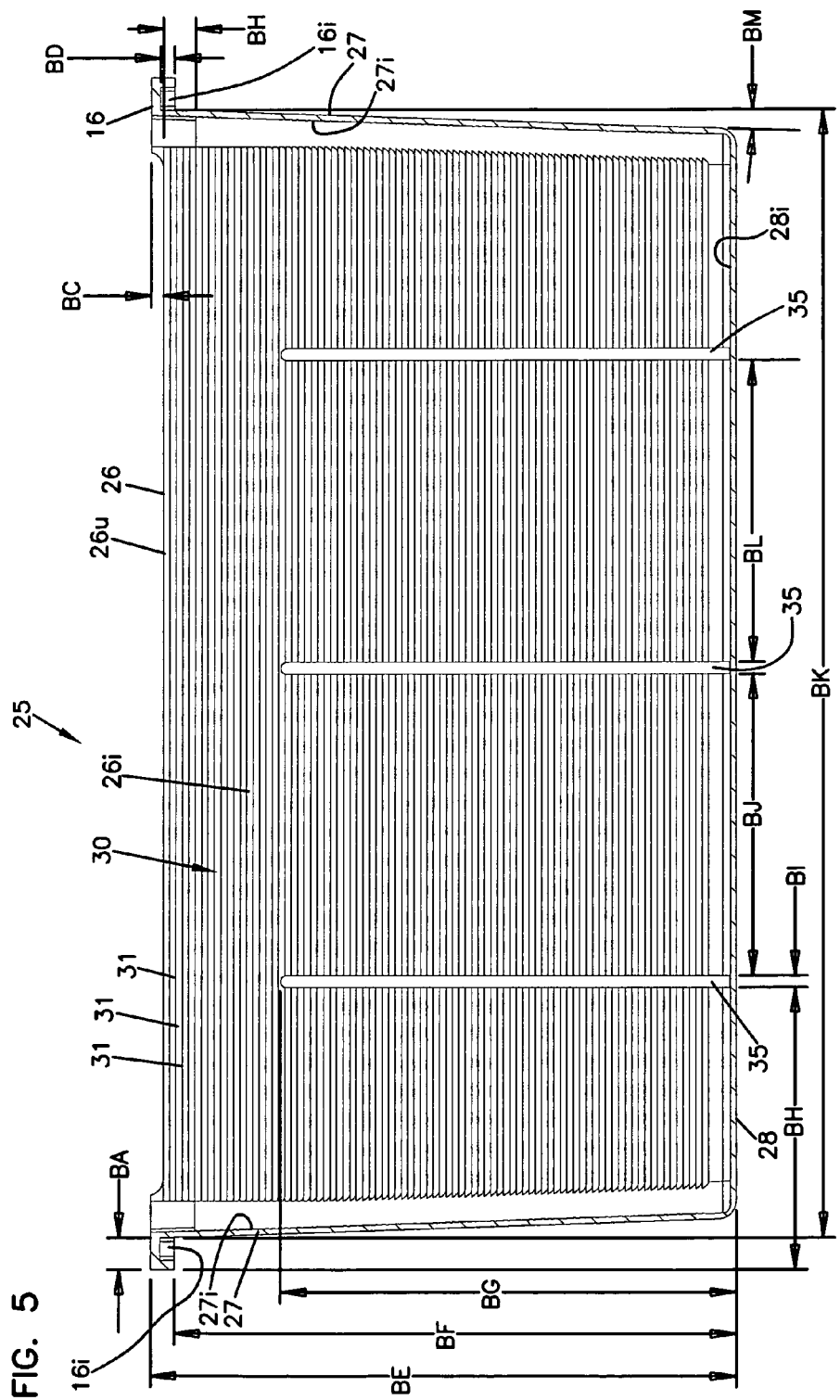
FIG. 5 is a schematic, side cross-sectional view of the receptacle of FIG. 4, taken generally along line 5-5, FIG. 4.

Attention is now directed to FIG. 5, a cross-sectional view taken along line 5-5, FIG. 4. Here, internal surface 26$i$ of one of the walls 26 is viewable, with vertical ribs 35 extending upwardly from bottom 28.

Referring to FIG. 5, the inner surfaces of 27$i$ of end walls 27, i.e. interior surfaces 27$i$, can be viewed, in extension from projections 16 downwardly to base 28.

In wall 26, a plurality of horizontal or longitundal ribs or shelves 31 can be seen forming ladder arrangement 30 in interior surface 26$i$ of the viewed sidewall 26. Again, it will be understood that analogous ribs or shelves are typically provided on all four sidewalls. Further detail concerning the ribs 31, which operate as a ladder arrangement 30, is provided herein below.

Still referring to FIG. 5, it is noted that projections 16 have, underneath, receivers 16$i$ which will facilitate gripping.

Figure 6:
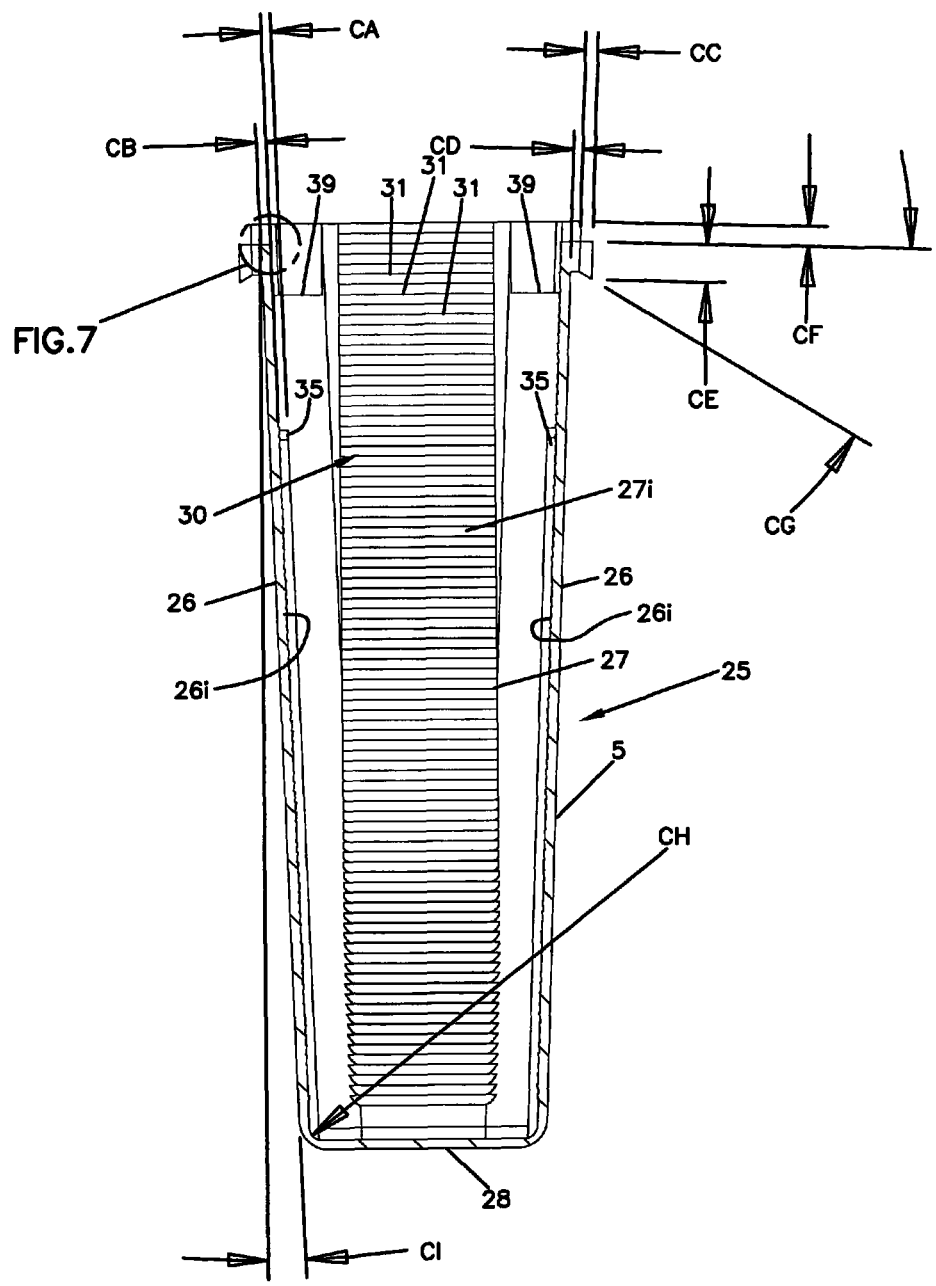
FIG. 6 is a schematic, end cross-sectional view of the receptacle taken generally along line 6-6, FIG. 4.

Attention is now directed to FIG. 6, a cross-sectional view taken along line 6-6, FIG. 4. Here, one of the sidewalls 27 is viewable, with interior surface 27$i$ including a portion of ladder arrangement 30 in the form of horizontal or longitundal ribs or shelves 31.

In FIG. 6, an inwardly slant of interior surfaces 26$i$ of sidewalls 26, in extension downwardly toward base 28 is viewable.

Figure 7:
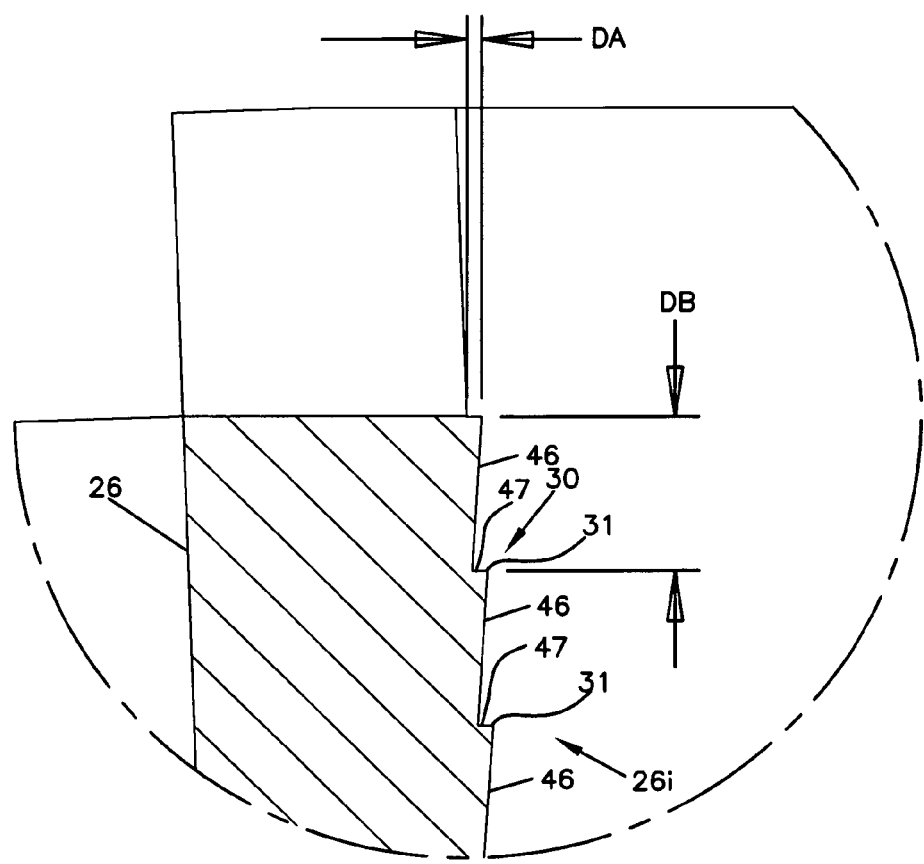
FIG. 7 is a schematic, enlarged fragmentary view of an identified portion of FIG. 6.

Attention is now directed to FIG. 7, an enlarged fragmentary view of an identified portion of FIG. 6. Here, a selected portion of surface 26i is viewed in cross-section, in an enlarged view. Ribs or shelves 31, comprising a portion of ladder arrangement 30 are shown in profile.

Referring to FIG. 7, it can be seen that each of longitudinal shelves 31 includes an inwardly slanted, generally vertical, surface 46 positioned extending upwardly from a step 47. A distance between steps 47 is typically chosen, so that the bees, should they reach interior surfaces 27i, 26i, can crawl upwardly. Typically, the length of surface 46, above selected step 47, indicated generally at dimension DB, FIG. 7, is at least 0.05 inch (1.27 mm) and no greater than 0.2 inch (5.1 mm), typically within the range of 0.07-0.15 inch (1.8-3.8 mm), inclusive, although alternatives are possible.

It is noted that in extension upwardly, each of surfaces 46 generally slants outwardly, from an inward edge of a lower step 47, to an outer edge of a next upper step.

It is noted that in FIGS. 4-7, some example dimensions are identified. While the techniques characterized herein in can be applied in a variety of bee feeders having a variety of alternate dimensions, identification of the dimension available will be useful in understanding the general principles of the present disclosure. Further, the dimensions chosen are usually particularly convenient for assembling a bee feeder usable in many conventional hive boxes. Example dimensions for FIGS. 4-7 are as follows: AA=3.18 inches (80.8 mm); AB=3 inches (76.2 mm); AC=0.13 inch radius (3.3 mm); AD=19 inches (483 mm); BA=0.5 inch (12.7 mm); BC=0.2 inch (5.1 mm); BD=0.23 inch (5.8 mm); BE=9.13 inches (231.9 mm); BF=8.75 inches (222 mm); BG=7 inches (178 mm); BH=4.5 inches (114.3 mm); BI=0.19 inch (4.8 mm); BJ=4.81 inches (122 mm); BL=4.81 inches (122 mm); BM=2° draft; BK=18 inches (457 mm); CA=0.09 inch (2.3 mm); CB=0.09 inch (2.3 mm); CC=0.12 inch (3 mm); CD=0.09 inch (2.3 mm); CE=0.37 inch (9.4 mm); CF=0.2 inch (5.1 mm); CG=30°; CH=0.13 inch radius (3.3 mm); and CI=2° draft; DA=0.01 inch (0.25 mm); and, DB=0.1 inch (2.5 mm). The receptacle 5 would have about a 1.47 gallon (5.56 liter) capacity.

Figure 8:
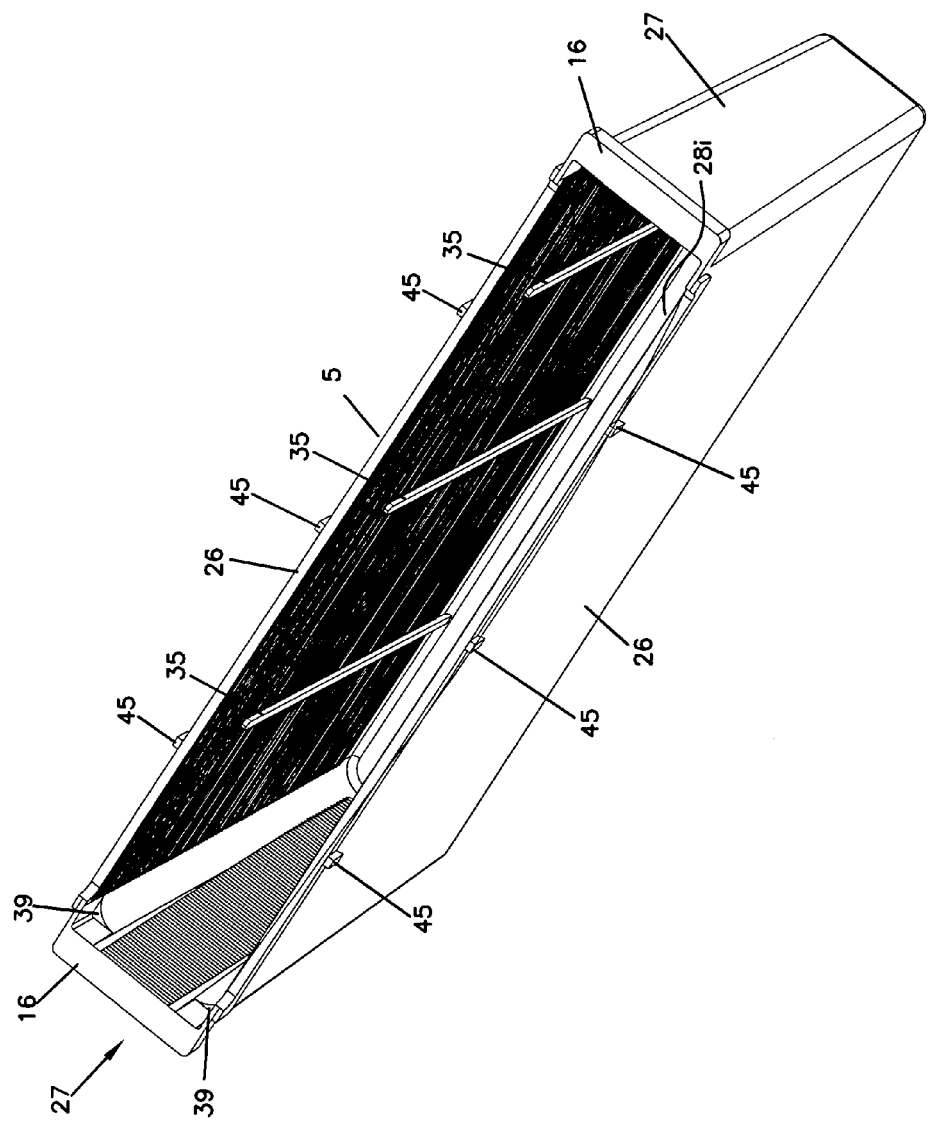
FIG. 8 is a second schematic, perspective view of the receptacle component of FIG. 3.

In FIG. 8, a second top perspective view of receptacle 5 is provided, allowing the viewer greater observation of interior 5i. It is noted that projections 45 are arranged in pairs across opposite sides of receptacle 5.

Figure 9:
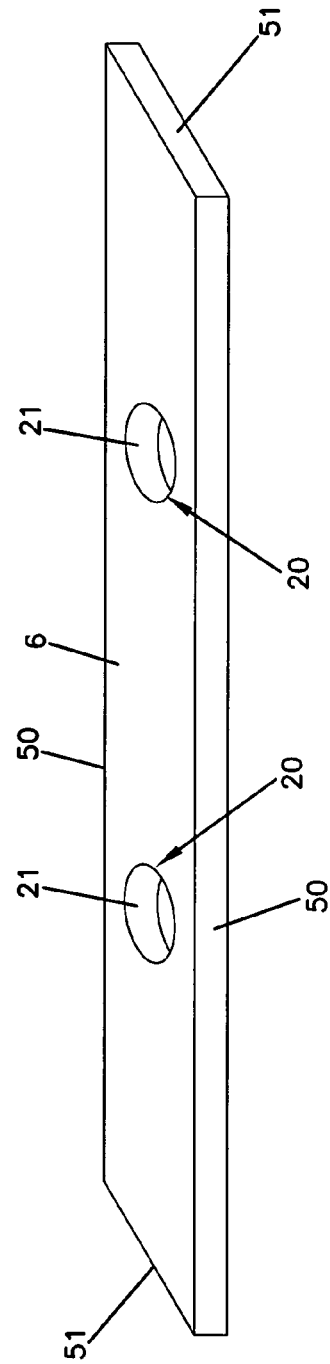
FIG. 9 is a schematic, top perspective view of a cover component of a bee feeder assembly according to the present disclosure.

Attention is now directed to FIG. 9, a perspective view of cover member 6. The cover member 6, for the example assembly 1 depicted, has a generally rectangular shape with opposite long sides 50; and, opposite short sides 51.

The cover member 6 has an aperture arrangement 20 therein, comprising at least one aperture extending through cover 6. Typically, the cover member 6 has a plurality of apertures therethrough. In the example, two apertures 21 are provided.

The apertures 21 are sometimes referred to herein as bee transport apertures; the apertures 21, of aperture arrangement 8 each being sufficiently large and ready for passage therethrough of bees. Typically, each aperture 21, in a bee transport aperture arrangement 20, will comprise a bee transport aperture having a minimum dimension thereacross of at least 1 inch (25.4 mm), usually at least 1.25 inch (31.8 mm), and typically 1.25-1.75 inch (31.8-44.5 mm), inclusive, often not more than 2 inches (51 mm) although alternatives are possible. The particular example apertures 21 depicted are each about 1.5 inch (38.1 mm) diameter circles.

Typically, cover member 6 will be formed from a material that does not expand or contract extensively, under expected temperature fluctuations of use. While a variety of materials can be used, it is expected that typically cover member 6 will typically be formed from wood.

Attention is now directed to FIGS. 10 and 11. In FIGS. 10 and 11 the interior bee ladder arrangement 8 is depicted. For the particular examples provided, the ladder arrangement 8 comprises internal bee ladders 60, one each associated with one each of bee transport apertures 21. Each internal bee ladder 60 comprises a hollow, depending member 61 having an upper, open, end 63 and a closed, lower, end 62. Further, each internal ladder 60 includes a sidewall 65 surrounding an open interior 66. The sidewall 65 is generally formed from a relatively stiff, but flexible, material which will tend to return to its shape, if distorted. Typically, a plastic mesh such as an extended polypropylene mesh will be usable; the mesh being porous; i.e. having a plurality of pores 70 therethrough. The mesh typically has a rough (non-smooth) inner surface, (in the example, caused by extruded strands overlapping), for selective engagement by bees.

Typically, the pores 70 are substantially small so that bees are inhibited from passing (crawling) therethrough, but sufficiently large to permit nutrient flow therethrough. Although alternatives are possible, in a typical mesh, the pores 170 will be circular, square, or diamond-shaped to have a cross-sectional dimension of no smaller than about 0.1 inches (2.54 mm), and no greater than about 0.22 inches (5.6 mm), usually 0.11-0.2 inches (2.8-5.1 mm), inclusive, a typical example being about 0.12 inch (3 mm)-0.19 inch (4.8 mm), inclusive, across. That is, typically the mesh from which internal ladders 60 are formed, is a mesh with openings 70 about 0.12 inches (3 mm)-0.19 inches (4.8 mm) across, inclusive.

An example polypropylene internal ladder member 60, will be extruded with a wall thickness of about 0.0675 inch (1.71 mm), a cross member thickness of 0.065 inch (1.65 mm), a total length of about 8.875 inches (225.4 mm), and a bottom edge 62 which is heat sealed closed. Alternate specific configurations are possible.

Figure 12:
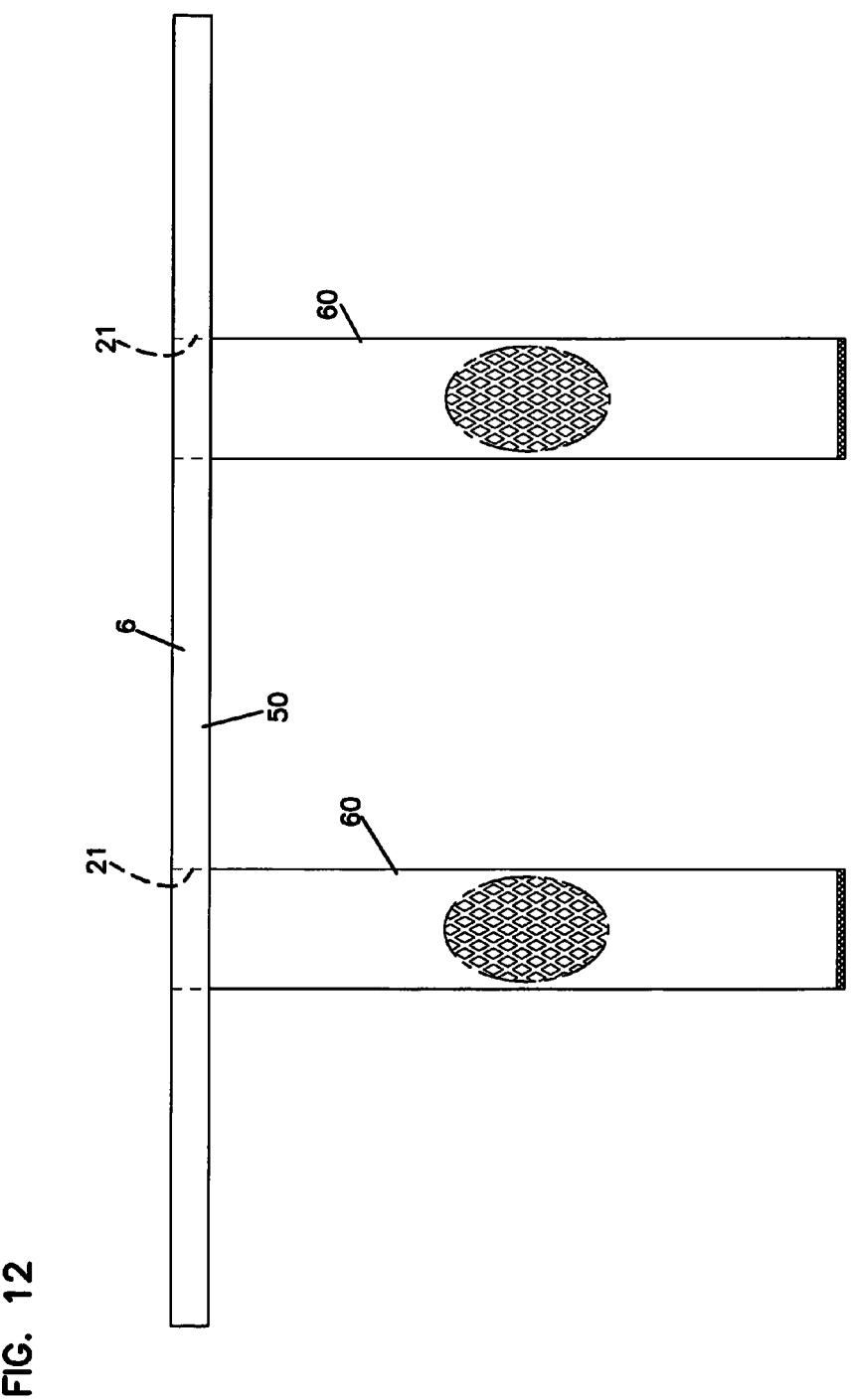
FIG. 12 is a schematic, side elevational view depicting a cover assembly including two ladder components in accord with FIGS. 10 and 11, operably positioned in association with a cover component in accord with FIG. 9, for installation in a bee feeder assembly according to the present disclosure.

Attention is now directed to FIG. 12, in which a cover assembly including a pair of internal ladders 60 is shown mounted on cover member 6, by extension through downwardly from apertures 21. If the internal size (diameter) of apertures 21 and the external size (diameter) of ladder member 60 are chosen appropriately, the ladder member 60 can be depended from the cover member 6 by friction fit without mechanical attachment or a connector between the two: i.e. relying only on friction fit. Manufacture of the ladder member 60 from plastic which is relatively stiff, but capable of deflection, will be suitable to facilitate this.

In a typical assembly, the ladders 60 would be mounted on the cover member 6, before the cover member 6 is positioned on receptacle 5.

Referring again to FIGS. 1 and 2, the cover member 6 is shown positioned on receptacle 5, resting on shelf members 39, FIG. 3. Once positioned, the internal ladders 60 will extend downwardly, typically resting against bottom 28i, FIG. 8.

To secure the cover member 6 in place, stretchable (elastic) band members 75, which form releasable stretched-band, securing arrangement 7, are positioned extending across pairs of projections 45, over cover member 6. This will securely hold cover member 6 in position.

Prior to positioning cover member 6, with ladders 60 thereon, on receptacle 5, receptacle 5 will typically have been filled with a nutrient solution.

Bees can enter ladders 60, through open end 63 thereof, by passage through apertures 21. The bees can crawl down the ladder 60, and will encounter the nutrient; but the bees are typically too large to pass through pores 70. Also, bottom ends 62, of the inner ladders 60 are closed. Thus, the bees cannot, in a typical operation, exit ladder 60 within interior 5i of receptacle 5. This keeps the bees safe, as it inhibits bees from becoming entrapped in the nutrient. Also it inhibits the bees from forming hive material within receptacle 5.

It is noted that in the event that the assembly 1 is used without the ladders 60, the ribbed sidewalls of receptacle 5 will provide a ladder arrangement for bees that enter interior 5i.

II. General Comments

According to the present disclosure, a bee feeder assembly is provided. The bee feeder assembly includes a receptacle defining an interior and having a bottom, a sidewall, and an open top. A cover assembly is provided, including a cover member positioned over the open top, to close the receptacle. The cover member includes a bee transport aperture arrangement therein. The term "bee transport aperture arrangement" is meant to refer to an aperture arrangement that is sufficiently large for bees to easily enter and exit therethrough, between an exterior environment and an interior of the receptacle.

Typically, the bee transport aperture arrangement will include at least one aperture, usually a plurality of apertures. In an example depicted, the bee transport aperture arrangement comprises two apertures, each one having a cross-sectional size of at least 1 inch (28.4 mm), typically not greater than 2 inches (50.8 mm), and usually within the range of 1.25-1.75 inch (31.8-44.5 mm), inclusive. The example bee transport apertures depicted through the cover member each comprise a circular bore through the cover member.

The cover assembly also includes a bee inner ladder arrangement comprising at least one inner ladder positioned in the receptacle interior, depending downwardly from the cover. Each bee ladder within in the bee ladder arrangement generally has a porous sidewall defining an interior, an open end, a closed end, and, a hollow interior.

Each bee ladder is positioned to depend downwardly from a bee transport aperture in the cover member, such that a bee entering the bee transport aperture can pass through a cover member and into the interior of the bee ladder, through the open end thereof. Each bee ladder is porous, with pores on the sidewall sufficiently small to inhibit the bees from passing therethrough, into the interior of the receptacle but exterior of the bee ladder. Typically the pores in the sidewall of the bee ladder are least 0.1 inch (2.54 mm) across and not more than 0.22 inch (5.6 mm) across to provide for this.

Typically, each bee ladder is not mechanically connected to the cover member with a mechanical connector, but rather is friction fit in a bee transport aperture, providing for convenient assembly and disassembly during use.

In an example arrangement, the cover member is removably secured to the receptacle, by a stretched band securement arrangement. In particular, the receptacle includes a plurality pairs of (hooks) projections thereon. A stretchable band member sized to extend between the members of each pair, across the cover member, when the cover member is in place. As a result, the stretchable or elastic bands will secure the cover member in place on the receptacle. In the example depicted, the receptacle includes three (3) pairs of such projections and three (3) elastic bands are used.

In a typically assembly, the receptacle will comprise plastic and the cover member will comprise wood, although alternative materials are possible.

In a typical assembly, the bee ladder comprises an extruded plastic with a closed, heat sealed, end opposite the open end. Typically each bee ladder is sufficiently long for the ladder closed end to abut the bottom of the receptacle.

In a particular example depicted, the receptacle includes a corner shelf arrangement, in which the cover member is positioned; the cover shelf arrangement being recessed slightly from the uppermost edge of the receptacle. Further, the receptacle has a generally rectangular shape, with opposite long sidewalls and opposite narrow sidewalls, the narrow sides each having an upper end with a hanger projection extending outwardly therefrom, to form: a handle arrangement for handling; and, a hanger arrangement for positioning the receptacle in a hive box. Typically the sidewalls taper inwardly, in extension from the upper edge of the receptacle to the bottom of the receptacle.

In a typical assembly, the sidewall of the receptacle defines an interior with a horizontal rib sidewall ladder arrangement thereon. In the example depicted, the horizontal rib, sidewall, ladder arrangement comprises a plurality of vertically spaced shelves. This allows any bees that do enter interior of the receptacle, exteriorly of any inner ladder arrangement, to still crawl up the sidewall of the receptacle if necessary. Further, it permits the receptacle to be used without the inner ladder depending from the cover, if desired.

Also according to the present disclosure, a method of feeding bees is provided. The method includes putting nutrient into a receptacle with an open top. Further, the method includes positioning, over the open top, a cover assembly that comprises a cover member with apertures (i.e. bee transport apertures) therethrough; and, a bee ladder friction fit in each aperture; each bee ladder being porous and having a closed end projecting into the nutrient. Specific componentry for use in conducting the method is described. The method typically includes, after the bee feeder is assembled, positioning it, (typically by hanging) within a hive box.

There is no requirement that an assembly, component or method include all of the detailed features or techniques described herein, to obtain some benefit in accord with the present disclosure.

What is claimed:
1. A bee feeder assembly comprising:
 (a) a receptacle defining an interior and having: a bottom; a sidewall having a lower end in engagement with the bottom; and, an open top;
 (b) a cover member positioned over the open top, to close the receptacle;
  (i) the cover member including at least one circular bee transport aperture therethrough;
 (c) a bee inner ladder arrangement positioned within the receptacle interior and depending downwardly from the cover member;
  (i) the bee inner ladder arrangement comprising at least one bee ladder comprising a plastic mesh having a porous sidewall surrounding a hollow interior; the sidewall of the at least one bee ladder having pores therethrough in a portion surrounding the hollow interior;
   (A) a first lower end of the at least one bee ladder comprising a portion of the mesh deformed inwardly to define a lower end section of the porous sidewall which is porous in a portion tapering to a lower closed bottom edge; and,
   (B) a second upper end of the at least one bee ladder having a generally circular cross-sectional shape and comprising an open end;
   (C) pores in the sidewall and the first end of the at least one bee ladder being sufficiently small to inhibit bees from passing therethrough into the interior of the receptacle and exterior of the inner ladder arrangement; and, (D) the at least one bee ladder being sufficiently long to abut a bottommost portion of the receptacle and extend to a location adjacent to, and spaced from, the lower end of the sidewall such that a bee in the hollow interior of the least one bee ladder can access liquid having a liquid level near the bottom of the receptacle;

(ii) the at least one bee ladder being positioned to depend downwardly from the at least one bee transport aperture such that:

(A) a bee entering the bee transport aperture can pass through the open end of the at least one bee ladder to a location surrounded by the sidewall of the bee ladder, and be prevented from exiting the interior of the bee ladder, by the size of pores in the sidewall, except through the open end; and, (B) the sidewall of the at least one bee ladder does not contact the sidewall of the receptacle, so the bees cannot reach the sidewall of the receptacle, from the bee transport aperture.

2. A bee feeder assembly according to claim 1 wherein:
(a) the cover member is removably secured to the receptacle, by a stretched-band securement arrangement.

3. A bee feeder assembly according to claim 1 wherein:
(a) the receptacle comprises plastic; and,
(b) the cover member comprises wood.

4. A bee feeder assembly according to claim 1 wherein:
(a) the at least one bee ladder comprises plastic with a closed end.

5. A bee feeder assembly according to claim 1 wherein:
(a) the at least one bee ladder has a mesh structure with pores no greater than 0.22 inch across, therein.

6. A bee feeder assembly according to claim 1 wherein:
(a) the at least one bee ladder includes no mechanical connector between the bee ladder and the aperture.

7. A bee feeder assembly according to claim 1 wherein:
(a) the cover member includes two bee transport apertures therethrough; and,
(b) the assembly includes two bee ladders, each one associated with one each of the two bee transport apertures in the cover member.

8. A bee feeder assembly according to claim 1 wherein:
(a) each bee transport aperture in the cover member has a largest dimension across within the range of 1.25 to 1.75 inch, inclusive.

9. A bee feeder assembly according to claim 1 wherein:
(a) the receptacle includes a corner shelf arrangement on which the cover member is positioned;
(i) the corner shelf arrangement being recessed from an upper edge of the receptacle.

10. A bee feeder assembly according to claim 1 wherein:
(a) the sidewall of the receptacle defines an interior with a horizontal rib sidewall ladder arrangement thereon.

11. A bee feeder assembly according to claim 10 wherein:
(a) the horizontal rib sidewall ladder arrangement comprises a plurality of vertically spaced horizontal shelves in the sidewall of the receptacle.

12. A bee feeder assembly according to claim 1 wherein:
(a) the sidewall of the receptacle has: first and second long sides; and, first and second short sides;
(i) each of the sides tapering inwardly in extension from the open top to the bottom.

13. A bee feeder assembly according to claim 12 including:
(a) first and second opposite hanger projections extending outwardly from an upper end of each one of the first and second short sides.

14. A bee feeder assembly according to claim 1 wherein:
(a) the at least one bee transport aperture has a largest dimension thereacross of not more than 2 inches.

* * * * *